(12) United States Patent
So

(10) Patent No.: US 11,750,385 B2
(45) Date of Patent: Sep. 5, 2023

(54) SYSTEM AND METHOD FOR AUTHENTICATING A USER

(71) Applicant: PRISEC INNOVATION LIMITED, Wong Chuk Hang (HK)

(72) Inventor: Cheuk Yiu So, Quarry Bay (HK)

(73) Assignee: Prisec Innovation Limited, Wong Chuk Hang (HK)

( * ) Notice: Subject to any disclaimer, the term of this patent is extended or adjusted under 35 U.S.C. 154(b) by 428 days.

(21) Appl. No.: 16/764,439

(22) PCT Filed: Nov. 16, 2017

(86) PCT No.: PCT/CN2017/111349
§ 371 (c)(1),
(2) Date: May 15, 2020

(87) PCT Pub. No.: WO2019/095200
PCT Pub. Date: May 23, 2019

(65) Prior Publication Data
US 2020/0366484 A1    Nov. 19, 2020

(51) Int. Cl.
*H04L 9/32* (2006.01)
*G06K 19/06* (2006.01)
*H04L 9/08* (2006.01)
*H04L 67/146* (2022.01)

(52) U.S. Cl.
CPC ...... *H04L 9/3213* (2013.01); *G06K 19/06009* (2013.01); *H04L 9/0825* (2013.01); *H04L 9/3265* (2013.01); *H04L 67/146* (2013.01)

(58) Field of Classification Search
CPC ... H04L 9/3213; H04L 9/0825; H04L 9/3265; H04L 67/146; H04L 2209/56; H04L 9/083; G06K 19/06009
See application file for complete search history.

(56) References Cited

U.S. PATENT DOCUMENTS

| | | | |
|---|---|---|---|
| 10,567,381 B1* | 2/2020 | Baer | H04L 63/068 |
| 10,742,638 B1* | 8/2020 | Fischer | H04L 63/0428 |
| 10,757,104 B1* | 8/2020 | Goel | H04L 63/08 |
| 2006/0101507 A1 | 5/2006 | Camenisch | |
| 2012/0284786 A1 | 11/2012 | Somani et al. | |
| 2014/0279566 A1 | 9/2014 | Verma et al. | |
| 2015/0312233 A1* | 10/2015 | Graham, III | H04L 9/0894 713/171 |
| 2016/0012432 A1* | 1/2016 | Meshkati | G06Q 20/322 705/44 |
| 2016/0307196 A1* | 10/2016 | Achhra | G06Q 20/3821 |
| 2017/0053466 A1 | 2/2017 | Ouellette | |
| 2018/0109540 A1* | 4/2018 | Amar | H04L 63/0876 |

FOREIGN PATENT DOCUMENTS

| | | |
|---|---|---|
| CN | 107210918 | 9/2017 |
| GB | 2547472 | 8/2017 |

* cited by examiner

*Primary Examiner* — Mohammad W Reza
(74) *Attorney, Agent, or Firm* — RENNER KENNER GREIVE BOBAK TAYLOR & WEBER

(57) ABSTRACT

A system and a method for an electronic method of authenticating a user to establish a service session the method comprising the steps of receiving an access request at a service provider device from a user device, authenticating a user based on a unique user credential associated with the user, by the service provider, establishing a service session between the user device and the service device.

17 Claims, 9 Drawing Sheets

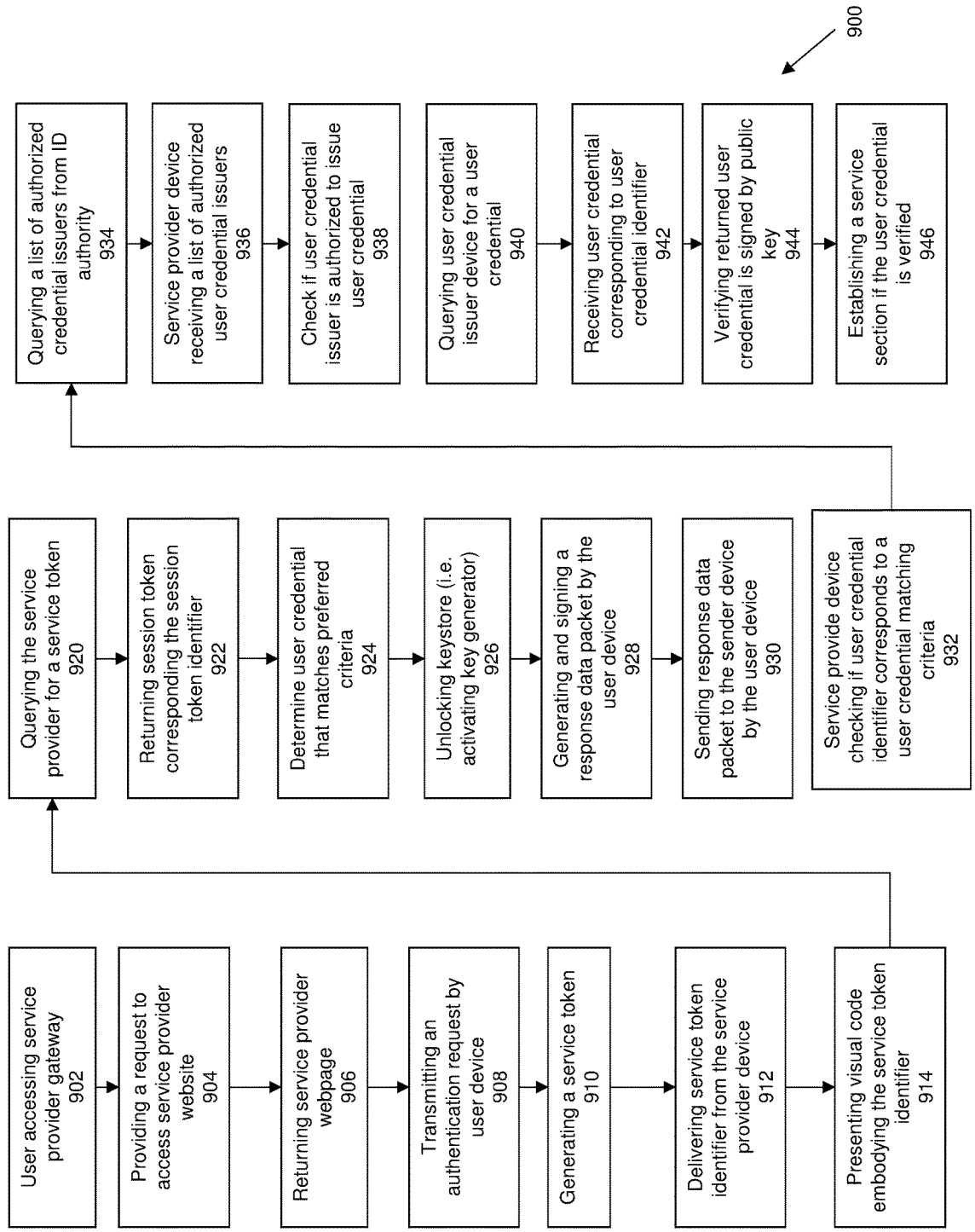

SYSTEM AND METHOD FOR AUTHENTICATING A USER

TECHNICAL FIELD

The present disclosure relates to a method and system for authenticating a user, in particular, but not limited to a method and system for authenticating a user for a service session to use a service for e-commerce.

BACKGROUND

Computer implemented communications via the internet are common place in modern society. The internet and other communications networks are commonly used to allow a user to communicate with a service provider to use a service offered by service providers. Online shopping or online payments or online banking are examples of services offered to users via a communications networks, e.g. the internet.

With increased economic globalization and the increased uptake and proliferation of e-commerce user authentication has become an increased issue. E-commerce e.g. online shopping or online financial transactions are increasingly becoming the norm and replacing traditional commercial activities that were in person activities. Authentication is a necessary step for various e-commerce activities such as for example for financial transactions since these e-commerce transactions are virtual activities. Virtual authentication is a required or necessary step to ensure electronic safety and verification that the user of an e-commerce system is the actual person. Authentication also helps to prevent, provides trust and security between a service provider and a user of the service provided by the service provider.

Currently the most common authentication protocol is for a user to create an account or follow some type of registration process with each service provider. In some of the common authentication protocols a user is required to register with each service provider. A service provider may require the user to provide an identity document or some form of identification to verify the identity of the user. The user then creates a user name and password linked to the user account. This allows a user to be authenticated by the service provider.

However this commonly used protocol is limited because each user has to register with each service provider. For example the user has to register for online banking, for online phone bill payment, for online shopping and so on. Such a protocol puts a large amount of overheads for each user and each service provider. Each service provider is required to have its own authentication process and store a list and authentication requirements for each user in a database or cloud storage or other suitable storage system. This requires investment from a service provider in appropriate technology e.g. computer architecture to use such a system, which can often require service overheads. These overheads often increase as service provider acquire more users. A user also is required to remember or record all the various passwords and usernames for each service provider, which can be cumbersome.

SUMMARY OF THE INVENTION

The present disclosure relates to a method and system for authenticating a user, in particular, but not limited to a method and system for authenticating a user for a service session to use a service for e-commerce or other computer implemented processes. It is an object of the present method and system for authenticating a user to address one or more of the drawbacks described above or at least provide the public with a useful alternative.

In accordance with a first aspect the present disclosure provides an electronic method of authenticating a user to establish a service session the method comprising the steps of:

receiving an access request at a service provider device from a user device, authenticating a user based on a unique user credential associated with the user, by the service provider, establishing a service session between the user device and the service device.

Preferably the unique user credential is a unique ID certificate associated with the user, wherein the ID certificate is a data object defining at least a user identity and a user credential issuer identity.

Preferably the unique user credential is issued by a user credential issuer, wherein the user credential issuer is authorized by the service provider.

Preferably the method comprises the additional steps of:

receiving a response data packet comprising at least a user credential identifier from the user device, by the service provider, determine a user credential that corresponds to the user credential identifier.

Preferably the step of authenticating a user comprises the additional step of:

querying the credential issuer device with the user credential identifier, receiving a user credential corresponding to the user credential identifier, checking the received user credential corresponds to the user credential identifier.

Preferably the step of authenticating a user comprises the additional step of establishing a service session, by the service provider device, if the received user credential from the credential issuer device corresponds to or matches the user credential identifier received in the response data packet from the user device.

Preferably the method comprises the additional steps of:

generating a session token by the service provider, that corresponds to a session, encoding the session token with authorization criteria.

Preferably the session token is a data object that comprises one or more of an ID of the session data field and an authorization criteria data field.

Preferably the authorization criteria comprises at least an accepted user credential issuer data field that defines the user credential issuer that will be accepted by the service provider in order to authenticate the user.

Preferably the method comprises the additional step of:

providing a visual code to the user device, by the service provider device, wherein the visual code comprises the session token.

Preferably the visual code is a machine readable optical code that is configured to be read or scanned by the user device to extract information from the visual code.

Preferably the visual code is one of a one dimensional barcode or a two dimensional code.

Preferably the method comprises the additional steps of:

receiving the visual code by the receiver device from the service provider device, decoding the visual code to extract the session token from the visual code, processing the session token to extract a user credential identifier.

Preferably the step of processing the session token comprises the additional steps of:

identifying a user credential issuer from the user credential issuer data field of the session token, identifying a user credential that corresponds to the user credential issuer, identify a user credential identifier based on the identified user credential.

Preferably the method comprises the additional steps of:

generating the response data packet comprising the user credential identifier, signing the response data packet with at least a private key using an asymmetric cryptographic process.

Preferably the method comprises the additional step of verifying the response data packet by a public key located in the user credential received from the user credential issuer, and the received user credential is considered to match if the public key corresponds to the private key used to sign the response data packet.

Preferably the step of processing the session token comprises the additional steps of:

querying a user database of user credentials to identify a user credential that corresponds to a received user credential issuer, the user database storing a list of one or more user credentials that correspond to each user credential issuer, the user database being populated by a computer implemented registration process, identifying the user credential that corresponds to the user credential issuer listed in the session token.

Preferably the computer implemented registration process comprises the steps of:

receiving a request for a unique user credential from a user device by a user credential issuer, create a unique user credential associated with the user based on a verified identity of the user, delivering the user credential to the user device, storing the user credential in a user database.

Preferably the step of storing the user credential in a user database comprises the additional steps of:

generating a key pair of a private key and a public key by the user device, associating the received user credential with the generated key pair, providing the public key of the key pair associated with the user credential to the user credential issuer for storing by the user credential issuer.

In accordance with a second aspect the present disclosure provides an electronic method of registration for registering a user with a user credential issuer comprising the steps of:

receiving a request for a unique user credential from a user device by a user credential issuer, create a unique user credential associated with the user based on a verified identity of the user, delivering the user credential to the user device, storing the user credential in a user database.

Preferably the step of storing the user credential in a user database comprises the additional steps of:

generating a key pair of a private key and a public key by the user device, associating the received user credential with the generated key pair, providing the public key of the key pair associated with the user credential to the user credential issuer for storing by the user credential issuer.

In accordance with a second aspect the present disclosure provides a system for authenticating a user to establish a service session, the system comprising:

a service provider device in electronic communication with a user device, the service provider device and user device configured for two way communication with each other via a communication network, the service provider device associated with a service provider and the user device associated with a user, the service provider device configured to receive an access request from the user device, the service provider device configured to authenticate a user based on a unique user credential associated with the user, wherein the user credential being issued by an authorized user credential issuer that is trusted by the service provider the service provider configured to establish a service session between the user device and the service device to allow the user to use a service provided by the service provider.

Preferably the unique user credential is a unique ID certificate associated with the user, wherein the ID certificate is a data object defining at least a user identity and a user credential issuer identity.

Preferably the system comprises a user credential issuer device associated with a user credential issuer and configured for two way communication with the service provider device and the user device, the user credential issuer device is configured to issue the unique user credential to a user, and wherein the user credential issuer is authorized by the service provider as an accepted user credential issuer.

Preferably the service provider device being configured to:

receive a response data packet comprising at least a user credential identifier from the user device, by the service provider, determine a user credential that corresponds to the user credential identifier.

Preferably the service provider device is configured to query the credential issuer device with the received user credential identifier, the user credential issuer device configured to transmit a user credential corresponding to the user credential identifier, the service provider device configured to receive the user credential corresponding to the user credential identifier, and the service provider configured to check the received user credential corresponds to the received user credential identifier.

Preferably the service provider device establishes a service session if the received user credential from the credential issuer device corresponds to the user credential identifier received by the service provider device, as part of the response data packet transmitted by the user device.

Preferably the service provider device is further configured to generate a session token that corresponds to a session, and the service provider device is configured to encode the session token with an authorization criteria.

Preferably the session token is a data object that comprises one or more of an ID of the session data field and an authorization criteria data field.

Preferably the authorization criteria comprises at least an accepted user credential issuer data field that defines the user credential issuer that will be accepted by the service provider in order to authenticate the user.

Preferably the service provider device is configured to provide a visual code to the user device, wherein the visual code comprises the session token.

Preferably the visual code is a machine readable optical code that is configured to be read or scanned by the user device to extract information from the visual code.

Preferably the visual code is one of a one dimensional barcode or a two dimensional code.

Preferably the user device receives the visual code from the service provider in response to a use request, the user device is configured to decode the visual code to extract the session token from the visual code, and the user device is configured to process the session token to extract a user credential identifier.

Preferably the user device is further configured to identify a user credential issuer from the user credential issuer data field in of the session token, the user device is configured to identify a user credential issuer from the user credential issuer data field of the session token, the user device configured to identify a user credential that corresponds to the user credential issuer, and;

the user device configured to identify the user credential identifier based on the identified user credential.

Preferably the user device is configured to generate the response data packet comprising the user credential identifier and the user device is configured to sign the response data packet with at least a private key using an asymmetric cryptographic process.

Preferably the system comprises a key generator, the user device configured to obtain a key pair from the key generator, wherein the key pair comprises a public key and a private key, and wherein the user device comprises the key generator and the key generator being controlled by the user device.

Preferably the service provider device is configured to verify the response data by a public key located in the user credential received from the user credential issuer device, and the service provider device is configured to determine a user credential is a match if the public key corresponds to the private key used to sign the response data packet.

Preferably user device is configured to query a user database of user credentials to identify a user credential that corresponds to a received user credential issuer defined in a user credential issuer data field within the received session token, the user database comprising a list of one or more user credentials issued by each user credential issuer, the database relating each user credential with the user credential issuer that issued the user credential, the database being populated by an electronic registration process, and;

wherein the user device is configured to identify the user credential that corresponds to the user credential issuer listed in the session token.

Preferably the electronic registration process is implemented by the system as per any of the first aspect or second aspect of the invention wherein the user credential issuer is configured to receive a request for a unique user credential from the user device, the user credential issuer configured to create a unique user credential associated with the user based on a verified identity of the user, the identity of the user being verified by the user credential issuer, the user credential issuer device configured to transmit the user credential to the user device, and the user device configured to receive and store the user credential from the user credential issuer device in the user database.

Preferably the user device is further configured to generate a key pair of a private key and a public key, the user device configured to associated the received user credential with the generated key pair, and the user device is configured to provide the public key of the key pair associated with the user credential to the user credential issuer device for storing by the user credential issuer device.

In accordance with a further aspect the present disclosure provides a system for registering a user with a user credential issuer comprising;

receiving a request for a unique user credential from a user device by a user credential issuer, create a unique user credential associated with the user based on a verified identity of the user, delivering the user credential to the user device, storing the user credential in a user database.

Preferably the step of storing the user credential in a user database comprises the additional steps of:

generating a key pair of a private key and a public key by the user device, associating the received user credential with the generated key pair, providing the public key of the key pair associated with the user credential to the user credential issuer for storing by the user credential issuer.

In a further aspect the present disclosure relates to a computer implemented method of authentication of a user comprising the steps of:

providing a use request to a service provider device from a user device, receiving the use request by the service provider device, generating a session token by the service provider device, wherein the session token is a data object that comprises one or more of an ID of the session data field and an authorization criteria data field, wherein the authorization criteria comprises at least an accepted user credential issuer data field that defines the user credential issuer that will be accepted by the service provider in order to authenticate the user, providing a visual code to the user device by the service provider device, wherein the visual code comprises the session token generated by the service provider device, the visual code is a machine readable optical code that is configured to be read or scanned by the user device to extract information from the visual code, wherein the visual code is a machine readable code is a barcode, decoding the visual code to extract the session token from the visual code, processing the session token to extract a user credential issuer from the user credential issuer data field of the session token, querying a user database of user credentials to identify a user credential that corresponds to a received user credential issuer, the user database storing a list of one or more user credentials that correspond to each user credential issuer, the user database being populated by a computer implemented registration process, identifying the user credential that corresponds to the user credential issuer listed in the session token, generating a response data packet comprising the user credential identifier, signing the response data packet with a private key using an asymmetric cryptographic process, a challenge data field of the response data packet being signed by the private key, and verifying the response data packet by a public key located in the user credential received from the user credential issuer, and the received user credential is considered to match if the public key corresponds to the private key used to sign the response data packet.

The term "comprising" (and its grammatical variations) as used herein are used in the inclusive sense of "having" or "including" and not in the sense of "consisting only of".

BRIEF DESCRIPTION OF THE DRAWINGS

Embodiments of the method and system for authenticating a user will now be described, by way of example, with reference to the accompanying drawings in which:

FIG. 9 shows a further embodiment of an electronic method of authenticating a user to establish a service session.

DETAILED DESCRIPTION OF THE PREFERRED EMBODIMENT

Figure 1:
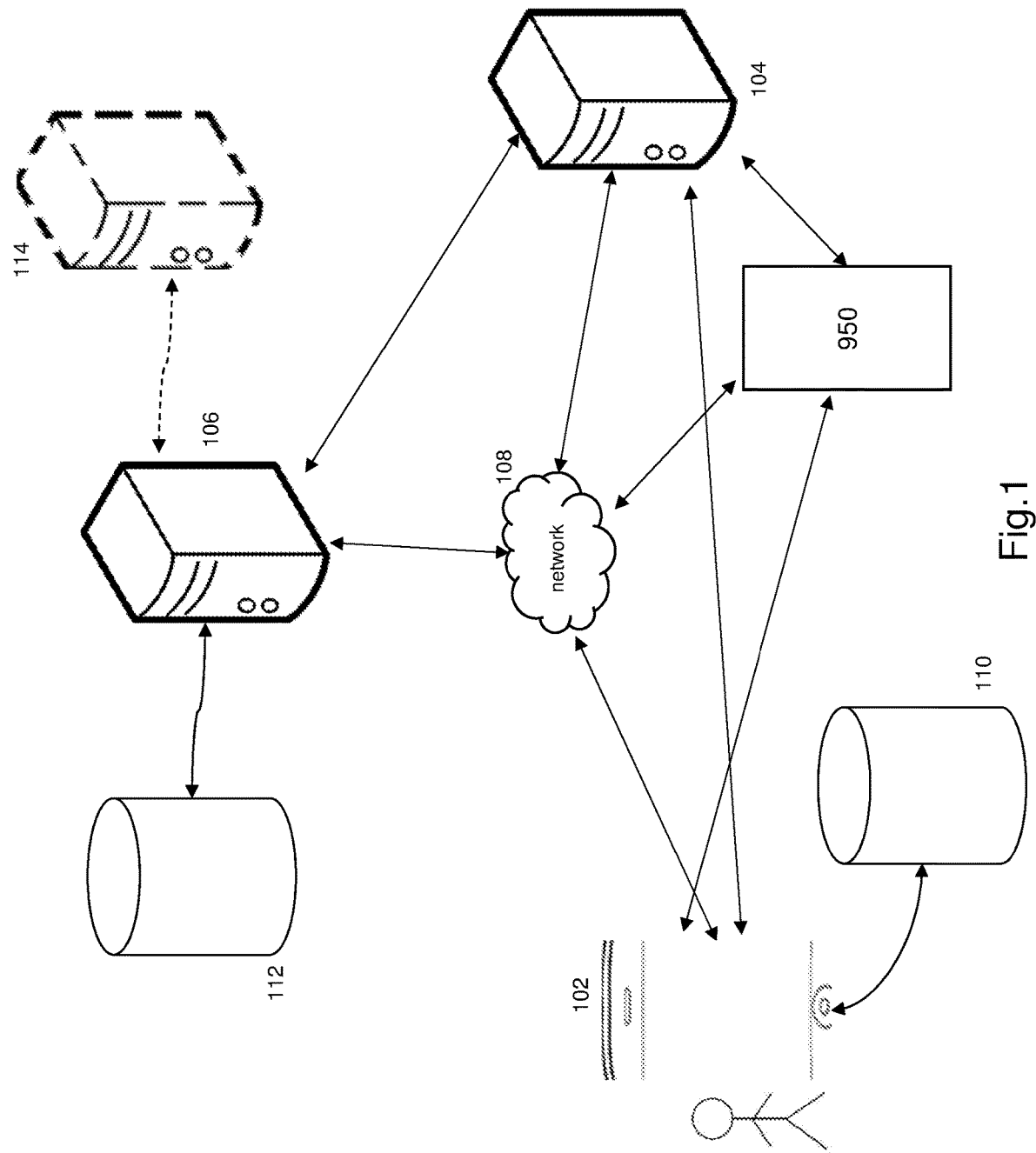
FIG. 1 shows an embodiment of a system for authenticating a user to establish a service session.

The present disclosure relates to a method and system for authenticating a user, in particular, but not limited to a method and system for authenticating a user for a service session to use a service for e-commerce.

The foregoing disclosure is directed some exemplary embodiments of a method and system for authenticating a user. In particular the present disclosure is directed to some exemplary embodiments of a protocol for authenticating a user that can be used to for authenticating a user in a service session. A service session as used herein means any electronic session for use of any service. For example a service session may relate to a payment session, or opening an account, or applying for a credit card or an e-commerce transaction or any other suitable session or activity. The present disclosure may be useful in sessions or use of services where authentication or authorization of a user are required e.g. financial transactions or other e-commerce uses. Electronic method as used herein means a computer implemented method that is implemented by one or more hardware computing devices. Modifications obvious to those skilled in the art can be made thereto without departing from the scope of the present disclosure.

The present disclosure relates an electronic method of authenticating a user to establish a service session between a service provider and a user comprising the steps of: receiving an access request at a service provider device from a user device, authenticating a user based on a unique user credential associated with the user, by the service provider, establishing a service session between the user device and the service device. The present disclosure also relates to a method for registering a user with a user credential issuer. The registration process is used to create a unique user credential that can be used as part of the authentication method or process. The unique user credential is a single credential that is unique to each user and can be used to identify and verify a user (i.e. authenticate) a user for use of a service provided by a service provider.

The method of authenticating a user is preferably a computer implemented method implemented by an electronic system comprising one or more hardware computing devices. The method of registering a user with a user credential issuer is also preferably a computer implemented method implemented by an electronic system comprising one or more hardware computing devices. The present disclosure relates to an authentication protocol and a registration protocol that is implemented by an electronic system.

The present disclosure also relates to a system for authenticating a user to establish a service session, the system comprising: a service provider device in electronic communication with a user device, the service provider device and user device configured for two way communication with each other via a communication network, the service provider device configured to receive an access request from the user device, the service provider device configured to authenticate a user based on a unique user credential associated with the user, the service provider configured to establish a service session between the user device and the service device to allow the user to use a service provided by the service provider. Preferably the unique user credential is a unique ID certificate associated with the user, wherein the ID certificate is a data object defining at least a user identity and a user credential issuer identity. The system for authenticating a user as described is configured to execute the protocol for authenticating a user as described herein. The system comprises a plurality of hardware components that are arranged in electronic communication with each other to implement the method of authenticating a user by a service provider (i.e. the authentication protocol).

Some exemplary embodiments of the system and method of authenticating a user by a service provider to establish a service session will now be described. FIG. 1 shows an exemplary embodiment of a system to authenticate a user by a service provider. Referring to FIG. 1, the system 100 to authenticate a user comprises a user device 102, a service provider device 104 and user credential issuer device 106. The user device 102, the service provider device 104 and the user credential issuer device 106 are all hardware devices that are linked together by a communication network 108. The communication network 108 is any suitable communication network that allows wireless communication, such as for example the internet or Wifi or any other suitable wireless communication network.

The service provider device 104 and the user device 102 are arranged in two way communication with each other. The service provider device 104 and the user device 102 are configured to communicate with each other via the communication network 108. The service provider device 104 and the user device 102 may be arranged in a client server relationship or any other suitable relationship. For example the service provider device 104 may function as a server to the user device 102 that may act as a client. Alternatively the client server relationship may change throughout the authentication process. Preferably the service provider device 104 and the user device 102 are configured for two way information exchange.

The service provider device 104 and the user credential issuer device 106 are configured for two way communication with each other via the communication network 108. The user credential issuer device 106 and the service provider device 104 are arranged in a server client relationship.

The user credential issuer device 106 may be arranged to function as a server and the service provider device 104 may act as a client device. Preferably the service provider device 104 and the user credential issuer device 106 are arranged for two way information exchange. The user credential issuer device 106 is also preferably a hardware device.

The service provider device 104 is a device associated with a service provider. A service provider is a party that provides a service to one or more users. The service provider may be business that offers an e-commerce offering or service useable by one or more users. For example the service provider may be a bank that offers online banking. In another example the service provider may be a store that provides an online store for purchasing of goods from the store. The service provider device 104 may be may any suitable computing device, such as for example a server or a desktop computer or a laptop or any other suitable device. Preferably the service provider device is a server associated with the service provider that is configured to host and present webpages for access by the user via the user device. In another example the service provider device 104 may be a server or server that are accessed by a cloud computing system. The service provider is also configured to authenticate the user based on a unique user credential associated with a user.

The user device 102 is associated with a user. For example the user device 102 may be a mobile device such as a mobile phone or a tablet or a laptop. Alternatively the user device 102 may be a desktop or other suitable computing device that can communicate with the service provider device 104 and/or the user credential issuer device 106. A user is a person or party that uses a service offered by the service provider. The user device 102 may comprise a user database 110. The user database 110 may be a relational database and may be stored on a memory unit of the user device 102. Alternatively the user database 110 may be stored on a remote memory unit and is accessible by the user device 102. The user database 110 may store a list of one or more user credentials that correspond to each user credential issuer. Each user credential stored in the user database 110 is a user credential that is associated with the user. The user database 110 also stores the user credential issuer that issued the particular user credential. In some examples there system 100 may comprise a plurality of user credential issuers that are trusted by the service provider, and hence each user may be identified by one or more unique user credentials.

The user is generally only identified by a single unique user credential from a single user credential issuer, i.e. a single user credential issuer cannot issue multiple user credentials to identify a single user. Hence a user credential issued by a user credential issuer is unique to a particular user and is used as a unique identifier to identify the user in the method or protocol of authentication. The user database 110 is populated by an electronic registration process or protocol that will be described later.

The user credential issuer device 106 is a device associated with a user credential issuer. A user credential issuer is an authorized organization that issues a unique user credential to a user. The user credential issuer is an authority that is authorized to issue user credentials and is accepted by the service provider as a party that can officially issue user credentials. Further the user credential issuer is trusted party by the service provider. The user credential issuer device 106 is configured to manage identities of various users, maintain a list of user credentials and the users that each credential is associated with. In some examples the multiple user credentials may be issued to a single user. The user credential list is preferably stored in a user credential database 112. The user credential issuer device 106 is configured to extract user credential information and write user credential information to the user credential database 112. The user credential database 112 may be stored in a memory unit of the device 106 or may be a remote database stored in a remote memory unit that is accessible via the communications network 108 or any other suitable communication network.

The user credential is an ID certificate that is associated with a single user to identify the user as being that person. The ID certificate is used to confirm the user's identity. In one example the ID certificate may be a data object or data string at least embodying information that confirms the identity of the user.

Optionally the embodiment of the authentication system 100 may also comprise a user ID authority device 114, associated with an ID authority. The user ID authority device 114 is shown in dashed lines to denote that the presence of a user ID authority device 114 may be optional. In one example the user the user credential authority may be a separate party to the user credential issuer 106. The user ID authority may be a central authority that is authorized to issue an identity or verify an identity of a user, such as for example a government licensing department or the tax department or any other authority that is allowed to issue identities. The user ID authority device 114 may be a hardware computing device that can communicate with the user credential issuer 106, service provider 104 and/or the user device 102. The ID authority 114 may issue a subject ID i.e. a user ID that is a unique identifier of the user. The subject ID may be transmitted to the user credential issuer 106 and can be used to create a user credential associated with a user. The ID authority device 114 may also store a list of authorized user credential issuers.

In one example the ID authority and the user credential issuer are the same party or group. In this configuration the ID authority device 114 and the user credential issuer device 106 may be the same device. Alternatively, the ID authority may be a separate party or group to the user credential issuer. In this exemplary configuration the ID authority device 114 and the user credential issuer device 106 may be separate devices that are configured to communicate with each other. In this configuration the ID authority (and device 114) outrank the user credential issuer (and device 106). The ID authority is a trusted or accepted as an identity issuing party, by the service provider.

Optionally the system 100 may also comprise a terminal unit 950 that acts as an intermediary between the service provider unit 104 and the user. The terminal unit 950 preferably comprises at least a processor, a memory unit, a set of computer readable and executable instructions that cause the processor to perform various functions and cause the terminal unit to perform various functions. The terminal unit 950 may also comprise a user interface to allow a user to input information and also view information. An example is a touch screen user interface. The terminal unit 950 also comprises one or more communications links and is configured to communicate with the service provider device 104 and the user device 102. In another example the service provider device 104 may be incorporated into or be part of the terminal unit 950. An example of a terminal unit 950 may be a POS terminal or an ATM machine or an electronic information board or any other terminal unit. The terminal unit 950 may be located within the premises of the service provider tor access by the user.

Figure 2:
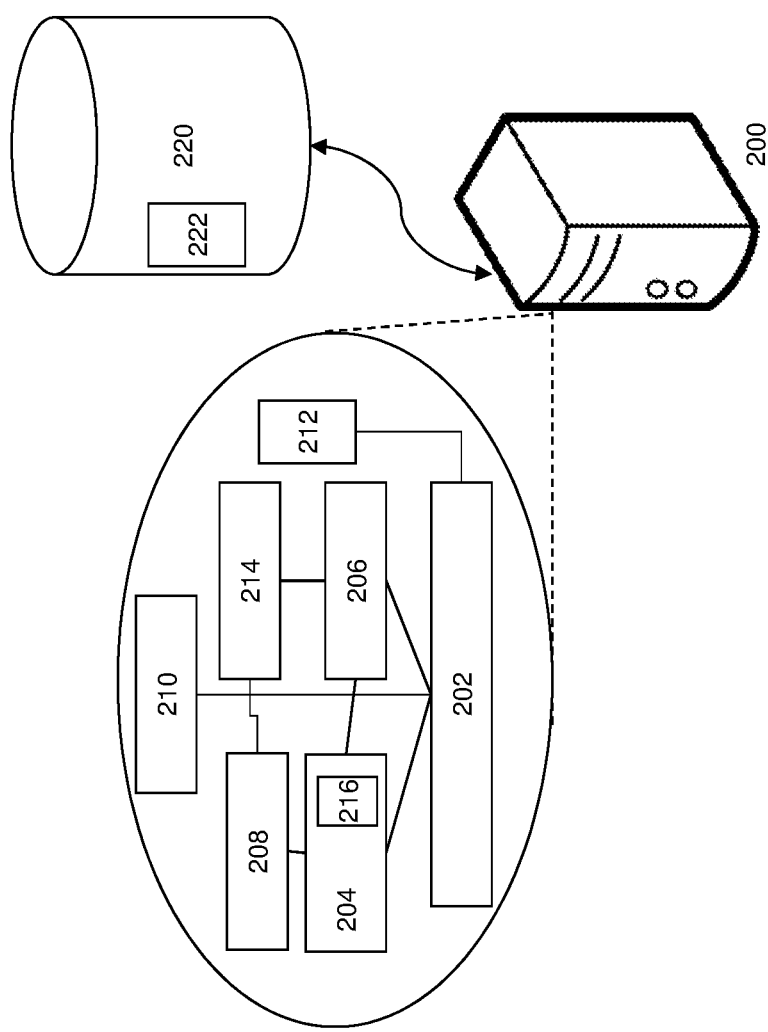
FIG. 2 shows a schematic diagram of a hardware computer device which in this example is a server.

FIG. 2 shows a schematic diagram of a hardware computer device which in this embodiment comprises a server 200. The server 200 comprises suitable components necessary to receive, store and execute appropriate computer instructions. The components may include a processing unit 202, read-only memory (ROM) 204, random access memory (RAM) 206, and input/output devices such as disk drives 208, input devices 210 such as an Ethernet port, a USB port 212, etc. and communications links 214. The server 200 includes instructions that may be included in ROM 204, RAM 206 or disk drives 208 and may be executed by the processing unit 202. There may be provided a plurality of communication links 214 which may variously connect to one or more computing devices such as a server, personal computers, terminals, wireless or handheld computing devices. The communications links 214 can be used to link with one or more communication networks such as the communication network 108. The communication links 214 also facilitate connection to and communication with one or more other devices in the network 100. At least one of a plurality of communications link may be connected to an external computing network through a telephone line or other type of communications link.

The computing device 200 may include storage devices such as a disk drive 208 which may encompass solid state drives, hard disk drives, optical drives or magnetic tape drives. The server 200 may use a single disk drive or multiple disk drives. The server 200 may also have a suitable operating system 216 which resides on the disk drive or in the ROM of the server 200.

The server 200 may optionally include a database 220 residing on a disk or other storage device which is arranged to store at least one record 222 such as for example a user credential or a public key or any other record, data object or data string. The processor 202 in one example is a computing device having a combination of hardware and software components to execute optical, electronic or computer instructions.

The user credential device 106 and the service provider device 104 preferably utilize the architecture of the server 200 described in FIG. 2. The user credential device 106 and the service provider device 104 preferably include all or at least all the major components of the server 200. The user credential device 106 and the service provider device 104 may have differences in hardware architecture to allow different functionalities as will be described herein. The software residing in the memory unit or storage device of the user credential device 106 is different to the software residing on the memory unit or storage device of the service provider device 104, hence providing different functionalities to each device. The user credential device 106 preferably comprises software stored as computer readable and executable instructions in a memory unit or storage device. The processor unit of the user credential device 106 is configured to execute the stored software to execute the one or more functions described herein as part of the authentication and registration protocols or methods. The service provider device 104 also comprises software stored as computer readable and executable instructions in a memory unit or storage device of the service provider device 104. The processor unit of the service provider device 104 being configured to execute the stored software to execute one or more functions as described herein by the service provider device 104, as part of the authentication and registration protocols or methods.

Optionally if the system 100 also includes an ID authority device 114, the ID authority device 114 may also substantially comprise the architecture of server 200. The ID authority device 114 may include at least a processor and a memory unit, as well as most of the other features of the server 200 described earlier. The ID authority device 114 may include its own set of computer readable and executable instructions as software, that when executed allow the ID authority to issue at least a subject identity to a user.

Figure 3:
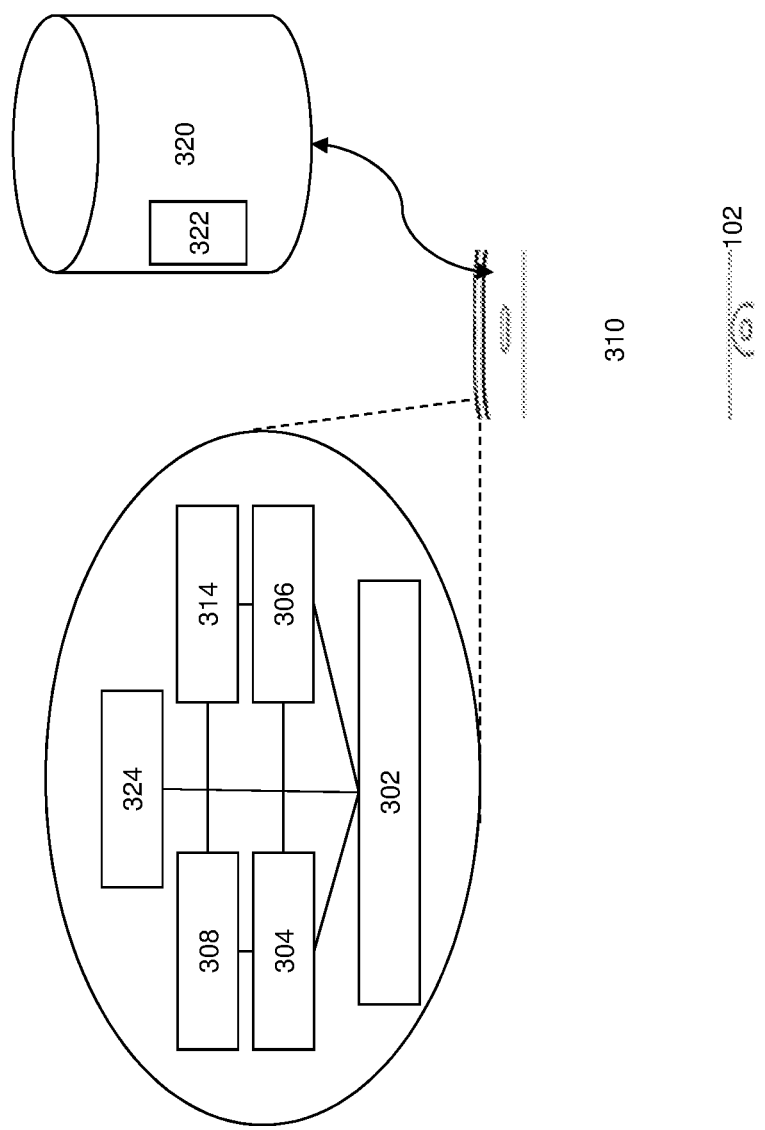
FIG. 3 shows a schematic diagram of a user device.

FIG. 3 shows a schematic view of a user device 102. The user device comprises a processing unit 302, at least one or more of a read-only memory (ROM) 304, random access memory (RAM) 306, and input/output devices 308, which in the illustrated example is a touch screen. Alternatively disk drives, or buttons or other input devices may be included in the user device 102. The user device 102 also includes a screen 310 for displaying information to a user. The user device 102 may include other input/output devices such as for example an Ethernet port, HDMI port, USB port or any other suitable ports or devices. The user device 102 includes instructions that may be included in a memory unit e.g. RAM or ROM or a disk drive and may be executed by the processing unit 302. There may be provided a plurality of communication links 314 which may variously connect to one or more computing devices such as a server, personal computers, terminals, wireless or handheld computing devices, within the system 100. For example the communications links 314 may be used to connect to the communication network 108 and also facilitate communication with the other system devices, in system 100. At least one of a plurality of communications link 314 may be connected to an external computing network through a telephone line or other type of communications link.

The user device 102 may include storage devices such as a disk drive 308 which may encompass solid state drives, hard disk drives, optical drives, flash memory or magnetic tape drives. The user device 102 may also have a suitable operating system 316 which resides on the disk drive or in the ROM of the user device 102.

The processor 302 in one example is a computing device having a combination of hardware and software components to execute optical, electronic or computer instructions. The user device 102 may optionally include a database 110 residing on a disk or other storage device which is arranged to store at least one record 322 such as for example a user credential or a private key. The user device 102 also comprises a key generator 324 (or a key store) that is configured to generate a key pair. The key pair includes a public key and a private key. The key generator 324 may be a hardware module or component residing within the user device and is controlled by software and/or the processing unit 302. Alternatively the key generator is a software module that is stored in a disk drive or memory unit. The key generator 324 is configured to generate keys that may be used to sign response data and the key pair is used as part of the process to authenticate a user.

The user device 102 comprises an application i.e. an app that is stored in a memory unit or disk drive, and executed by the processor 302. The application (i.e. app) is preferably a mobile app. The app is configured to control the key generator to generate a key pair comprising a private key and a public key. The keys may be any numerical key comprising random numbers or random characters or a mixture thereof. Alternatively the keys may be electronic or software keys that are generated by the key generator. The app also performs the function of including a digital signature to a data packet e.g. to a response data packet. The app further allows the user device to interconnect with the system and access the method of authentication. The app preferably also has security features such as firewalls or encryption to prevent access to any locally stored private keys on the user device 102.

Embodiments of methods of authenticating a user by a service provider and methods of registering a user with a user credential issuer will now be described in more detail. The present disclosure is directed to a method of authenticating a user with a service provider to establish a service session, such that the user can be use a service offered by the service provider. The authentication method is a protocol that can be used by any service provider to authenticate and verify the identity of a user. A registration process or protocol also may form part of the authentication process or protocol.

Figure 4:
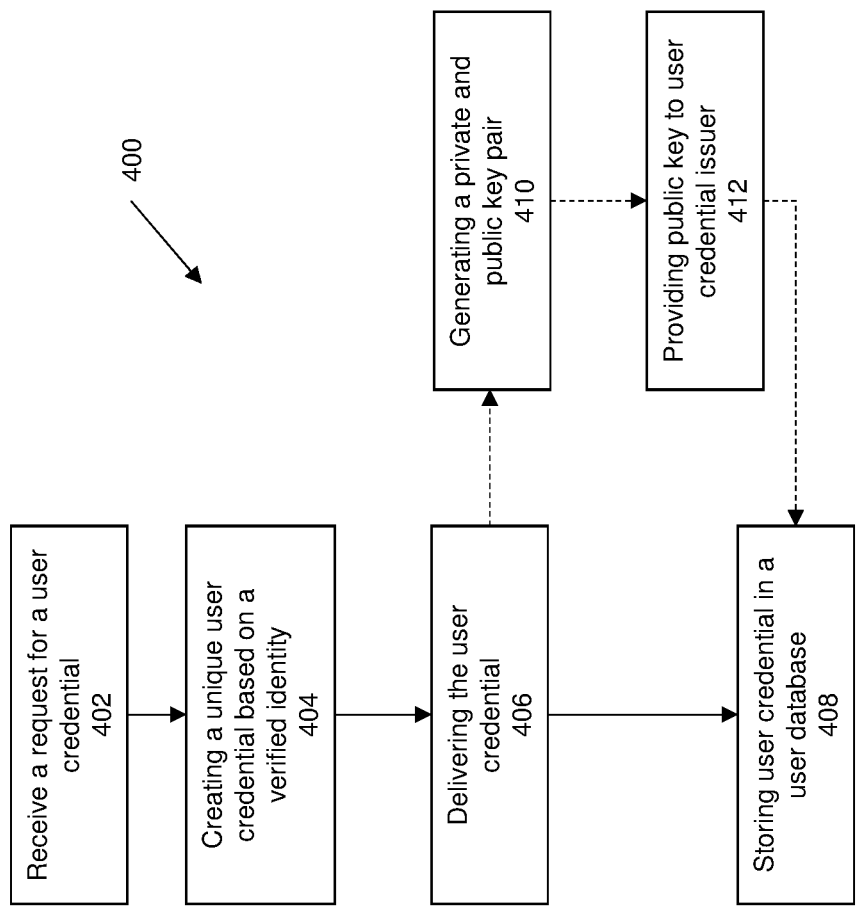
FIG. 4 shows an embodiment of a method of registering a user with a user credential issuer.

FIG. 4 shows an embodiment of a method 400 of registering a user with a user credential issuer. The method comprises step 402. Step 402 comprises receiving a request for a unique user credential from a user device by a user credential issuer. Step 404 comprises creating a unique user credential associated with the user based on a verified identity of the user. Step 406 comprises delivering the user credential to the user device. Step 408 comprises storing the user credential in a user database.

The method 400 of registering a user with a user credential issuer may also include the following additional steps. 410 comprises generating a key pair of a private key and a public key by the user device. Step 412 comprises associating the received user credential with the generated key pair, providing the public key of the key pair associated with the user credential to the user credential issuer for storing by the user credential issuer.

Figure 5:
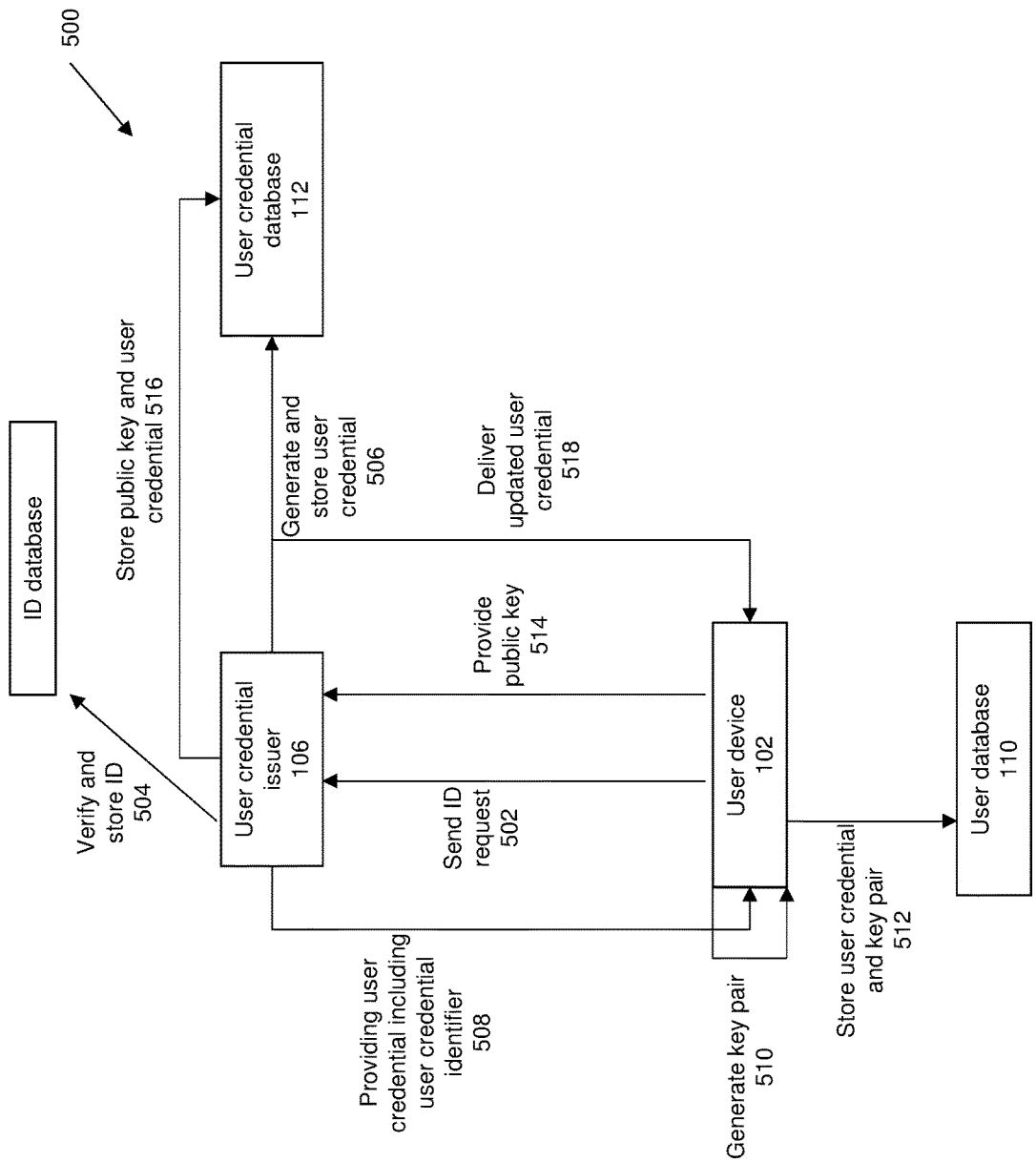
FIG. 5 shows another embodiment of a method of registering a user with a user credential issuer.

FIG. 5 shows a further embodiment of a method 500 of registering a user with a user credential issuer to allow authentication. Referring to FIG. 5, the method 500 commences step 502. Step 502 comprises providing an ID request from the user device 102 to the user credential issuer 106 device. In this embodiment the user credential issuer and the ID authority are the same party. Step 504 comprises verifying and storing an identity of the user either in a memory unit or a database such as an ID database. The ID database may store IDs of each user of the authentication system and method. Step 506 comprises generating and storing a user credential (i.e. an ID certificate) in a user credential database 112. Step 508 comprises providing at least the user credential identifier to the user device. Preferably step 508 comprises providing both the user credential and the user credential identifier to the user device 102 from the user credential issuer device 106.

Step 510 comprises generating a key pair from the key generator 324. The key pair comprises a private key and an associated public key. Step 512 comprises storing the user credential, user credential identifier and the key pair in the user database 110. The private key is maintained on the user device 102, either within memory or on the user database 110. Step 514 comprises providing the public key of the key pair to the user credential issuer device 106 by the user device 102. The public key that is returned is associated with the private key and the specific user credential that is stored in the user device 102. The method 500 proceeds to step 516 that comprises storing the public key on the user credential database in association with the specific user credential that has been registered as being associated with the specific user. Step 518 comprises the user credential device delivering an updated user credential including the public key to the user device for local storage. The method 500 is implemented by the various system components described.

Figure 6:
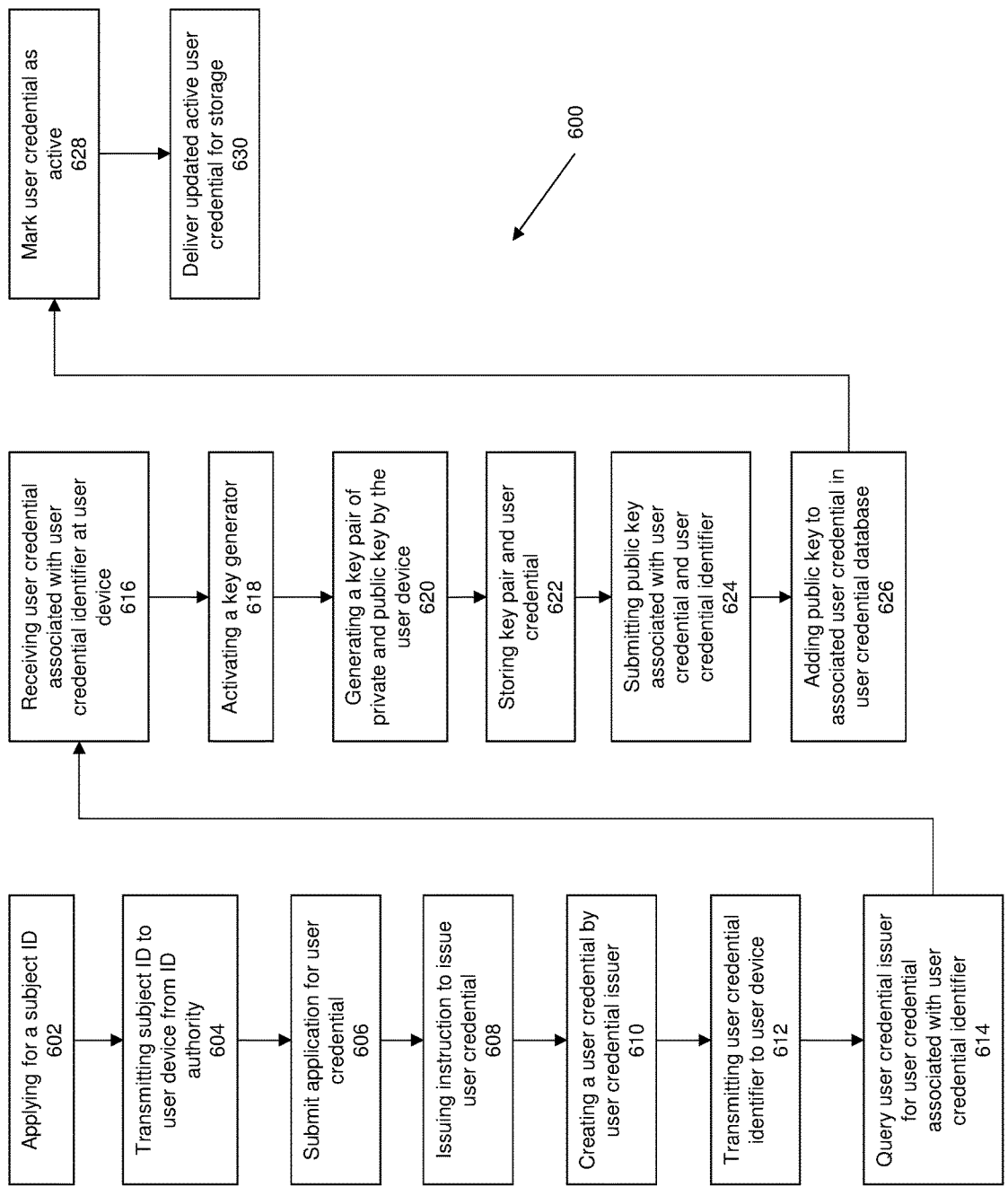
FIG. 6 shows a further embodiment of a method of registering a user with a user credential issuer.

FIG. 6 shows a further embodiment of a method 600 of registering a user with a user credential issuer. The method 600 is implemented by the various system components referenced in this description. In the embodiment of method 600, the system comprises a separate ID authority and a separate user credential issuer. The method 600 commences at step 602. Step 602 comprises applying for a subject ID to the ID authority. Step 602 comprises the user device 102 transmitting an ID application to the ID authority device 114. Step 604 comprises the ID authority device 114 transmitting a subject ID to the user device 102. The subject ID is a unique ID associated with the user. The ID authority is authorized to issue a subject ID. Step 606 comprises the user device 102 submitting an application to obtain a user credential to the ID authority device 114. Step 608 comprises the ID authority device 114 issuing an instruction to the user credential issuer device 106 to issue a unique user credential associated with the user. Step 610 comprises creating a user credential by the user credential issuer device 106. Step 612 comprises transmitting the created user credential identifier to the user device 102. At step 614 the user device queries the user credential device 106 for user credential associated with the user credential identifier, via the app. Step 612 is implemented to increase security and reduce the chances of the user credential being lost to an attacker, e.g. a hacker.

Step 616 comprises receiving the user credential associated with the user credential identifier. Step 618 comprises activating the key generator 324, by the app. Step 620 comprises generating a key pair that comprises a private key and a public key. The key pair is associated with the specific user credential that is received at the user device. Step 622 comprises storing the key pair and the user credential in either the user database or on a memory unit of the user device 102. The key pair is related or associated with the user credential. Step 624 comprises submitting the public key associated with the user credential and user credential identifier to the user credential issuer. Step 626 comprises adding the public key to the user credential in the user credential database. At step 628 the user credential device is further configured to mark the user credential as active by creating a flag or entry in the user credential data structure within an appropriate data field. Step 630 comprises delivering the updated user credential including the public key within it to the user device 102 for local storage.

Preferably, the user credential issuer shall sign the user credential by digital signature when the user credential issuer mark the user credential active. The signed value of the user credential shall be store together with the user credential, however the digital signature may also be stored separately from the ID certificate in some alternative embodiments, which may be retrieved whenever necessary. After the credential being marked as active, the credential issuer return a copy of the updated user credential and the signed value back to the user device which stores the user credential in the user database.

The user credential is an ID certificate. The user credential is preferably a data object or a data string comprising a plurality of data fields. In one example the user credential i.e. ID certificate comprises information about the identity of the user. Preferably the user credential includes the following major data fields:
  i. Issuer—the issuer of the identity certificate
  ii. ID—the id of the identity certificate
  iii. Subject Info—the information about the subject
  iv. Subject ID—the unique identifier of the subject, issued by the authority, in v. the format "<local>@<authority's identifier>", where the <local> part is managed by the authority
vi. Authority—the identifier of the authority
vii. Valid From—the valid starting date of the identity
viii. Valid Till—the valid ending date of the identity
ix. Status—the status of the identity
x. Public Key—the public key of the identity
xi. Private Key—only store in the App, never exist in Issuer's store
xii. Revoked At—the date when the identity is being revoked The user credential is a data object or data string that is used to query the user credential issuer by providing the identifier. The identifier may have a format of [Issuer, ID]. Therefore as long the data fields Issuer and ID are provided to the user credential device, the user credential device providing a query to the user credential database. Optionally or additionally, the other fields of the ID certificate may provide additional information about the user credential or the ID certificate. For example, the ID certificate may be defined with a valid period denoted by the fields of "Valid From" and "Valid Till", and may also be defined with one or status of the ID certificate, such as but not limited to:

"initialized"—the certificate has just been created by credential issuer and haven't been mapped to a public key "activated"—the certificate has now a public key associated with it and the credential make it as activate "expired"—the certificate is no longer activate due to reaching the ValidTill time "revoked"—the certificate is no longer activate due to the credential issuer revoked the certificate The system may also refer to any of these additional fields to improve the authentication process.

In one example embodiment, the credential issuer may centralize all user credentials, and the service provider may query the credential issuer for a particular credential of a user. The service provider may check the status if the identity might has been revoked every time it obtains the user credentials.

The service provider is not required to store all credential issued by the issuer, however the credential issuer will able to collect service usage statistic of all user, as the service provider will query the identity issuer for the public key of the user, then the identity issuer will have the query log which can indicates when did a user authenticated into a service, therefore the owner of the centralized system may know when did a user use their identity to access a service.

Alternatively, a distributed user's credential database may be used such that collecting user's usage info become impossible. In this embodiment, the protocol force the credential issuer to publish changes of the credential database, such as updating the status field of a certificate when a certificate reach a status of "activated"/"revoked". The service providers may subscribe to the update of the credential database of the credential issuer. This may enable the service provider to have all the credentials created (except certificate which just initialized) by the credential issuer and all the related changes of all credential.

The user credential issuer may also sign the user credential by digital signature and then issue publish the credential to the distributed database with the signed value when necessary, for example when the user credential issuer mark the user credential active, such that the updated credential and the corresponding sign value may be accessible to the service provider.

Preferably, the distributed user's credential database may include a peer-to-peer distributed database or a blockchain enabled database. Advantageously, the service provider will no longer need to query the issuer's centralized database when a user is authenticating into a service, as the credential and the status of an identity is already being accessible by the service provider, thus protecting the user's privacy as the issuer has no clue on when did the user get authenticated into a service.

Figure 7:
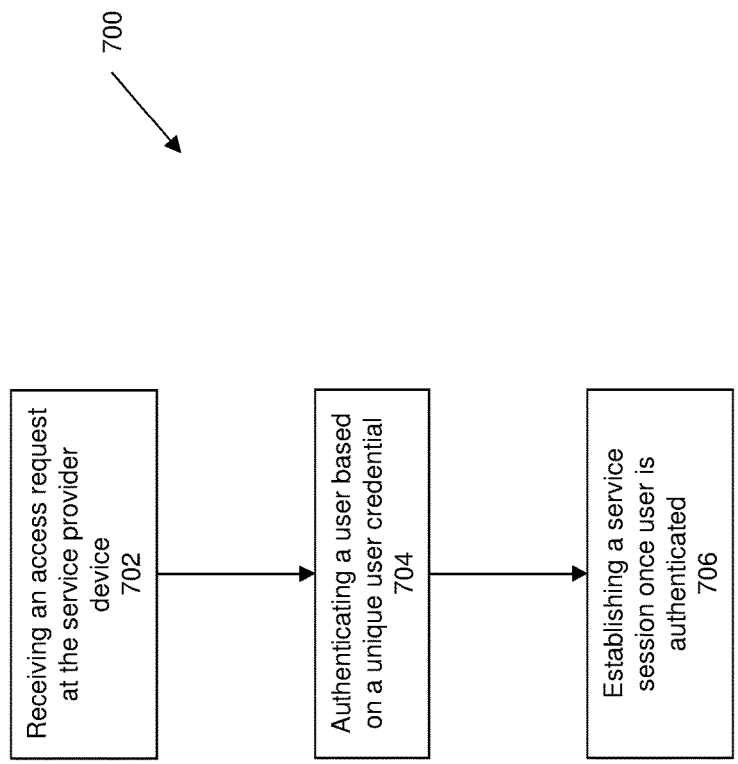
FIG. 7 shows an embodiment of an electronic method of authenticating a user to establish a service session.

Exemplary methods of authenticating a user to establish a service session will be described in more detail with reference to FIGS. 7 to 9. FIG. 7 shows a first exemplary method 700 of authenticating a user by a service provider to establish a service session between a service provider device and a user device. The service provider device is associated with a service provider and the user device is associated with a user. The method commences at step 702. Step 702 comprises receiving an access request at a service provider device from a user device. Step 704 comprises authenticating a user based on a unique user credential associated with the user, by the service provider, wherein the user credential is issued by an authorized user credential issuer trusted by the service provider. Step 706 comprises establishing a service session between the user device and the service device once the user is authenticated. Preferably the unique user credential is a unique ID certificate associated with the user, wherein the ID certificate is a data object defining at least a user identity and a user credential issuer identity.

Figure 8:
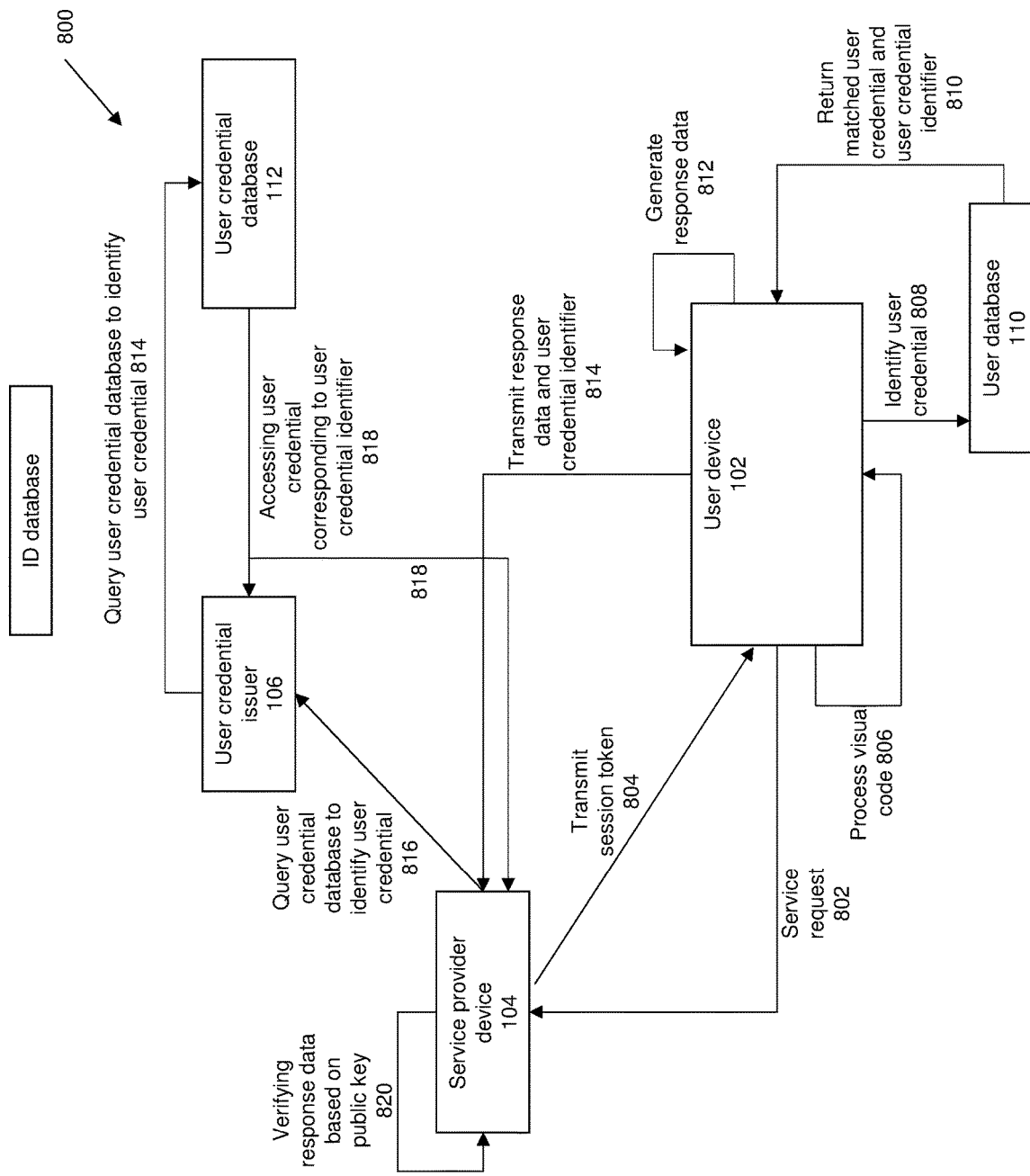
FIG. 8 shows a further embodiment of an electronic method of authenticating a user to establish a service session.

FIG. 8 shows another exemplary method 800 of authenticating a user to establish a service session between a user device and a service provider device. The method 800 commences at step 802. Step 802 comprises receiving a use request or service request at the service provider device 104 from the user device 102. The use request may be initiated by a user via the app (i.e. application) on the user device 102. Step 804 comprises the service provider device 104 transmitting a session token to the user device 102. The session token is a data object or a data string that comprises information about a service session.

Step 804 preferably comprises providing a visual code to the user device 102 by the service provider device 104. The visual code comprises the session token. The visual code is preferably a machine readable optical code that is configured to be read or scanned by the user device 102 to extract the information embodied within the visual code. Preferably the visual code is either a one dimensional barcode or a two dimensional barcode or other two dimensional code. The term barcode covers any dimensional barcode or optical code that can be scanned or read by appropriate hardware or software modules on a device.

For example, the token may be encoded into the visual code directly, such that the token may be obtained by the user device which may be used to scan and decode the visual code. Alternatively, the identifier of the token may be encoded into the visual code. The user device may scan the visual code and then retrieve the token by the identifier of the token by querying the service provider device or the credential issuer device.

The code may be presented on the screen of the user device 102. In another exemplary configuration the visual code may be presented at a terminal unit 950 e.g. a bank ATM or a POS terminal such that the code can be scanned by an appropriate scanner within the user device e.g. a barcode scanner. The user device 102 may also be NFC enabled such that the visual code may be scanned using an appropriate NFC scanner.

Alternatively, any electronic direct communication method (such as NFC) may be used to deliver the token or the identifier of the token to the user device. Preferably, such direct communication may involve establishing a one-to-one communication connection between the user device and the token issuer device so as to ensure the security of the communication.

If the service terminal and the user device are provided on the same device, then the service terminal may pass the token or the identifier of the token to the user device application directly without involving an actual communication signal between different terminal devices.

In yet an alternatively example, the user may provide an address for receiving the identifier of the token. For example, the address may be an electronic address such as an email address, the identifier may be delivered as a link and/or as a visual code which may be readable by the user device. The address may also include an actual or physical address such as a post address, then the visual code may be delivered to the user as a physical code to the address, which may be used when getting an ID certificate.

These methods for transmitting tokens to the user device may also be applied to registration when delivering the credential to user device. For example, when the credential issuer initial a certificate and deliver the certificate to the user device, the certificate may be delivered with the use of the visual code or methods according to any of the above-mentioned examples for transmitting the session token to the user device.

Step 806 comprises processing the code and session token to identify the user credential issuer from the user credential issuer data field of the session token. Step 808 comprises identifying the user credential that corresponds to the user credential issuer encoded within the session token. Step 810 comprises identifying a user credential identifier based on the identified user credential. Step 812 comprises generating a response data packet comprising the user credential identifier and signing the response data packet with at least a private key using an asymmetric cryptographic process. The private key is stored locally in the user device 102 or in the user database 110. The private key used to sign the response data packet corresponds to or matches the user credential and the relationship was established as part of the registration process. The asymmetric cryptographic process secures the response data packet and may even encrypt it making the process more secure from potential hackers or hijackers. The use of a unique private key that is associated with a unique user credential increases safety of the method and helps to maintain security of the method of authentication. The use of a private key also helps in creating increased confidence that the user credential being used to authenticate the user is actually associated with the user and has been created by an authorized user credential issuer as part of the registration process. Step 814 comprises transmitting the response data packet including the user credential identifier to the service provider device 814.

Step 816 comprises querying the user credential database 112, by the service provider device 104, to identify the user credential that corresponds to the user credential identifier received from the user device. The user credential database storing a list of one or more user credentials that correspond to each user. Step 818 comprises accessing a user credential from the user credential database based on the user credential identifier received from the user device. The user credential identifier may be formed as part of a response data packet that would have been signed by the private key of the user device. Step 820 comprises the step of verifying the response data packet by a public key located in the user credential received from the user credential issuer, and the received user credential is considered to match if the public key corresponds to the private key used to sign the response data packet. If the user credential can be verified as a match based on the user credential identifier and the public key, then the user is authenticated and a service session is established.

FIG. 9 shows a further example of a method 900 of authenticating a user by a service provider to establish a service session. The method commences at step 902 that comprises a user accessing a service provider gateway or portal e.g. a service provider website. In the example of FIG. 9 the user accesses the service provider gateway at a separate terminal unit 950. The terminal unit 950 is a hardware unit that includes a processor and a memory unit and I/O devices such as a touch screen. Step 904 comprises providing a request to access the website. The terminal is a client device to the service provider device 104 that acts as a server. Step 906 comprises returning a webpage. Steps 902-906 may be executed by an appropriate application on the user device or via the app that allows the user to access the method of authentication without the need of a terminal.

Step 908 comprises transmitting an authentication request by the user device via either the user device or terminal. At step 910 the service provider device 104 generates a session token. At step 912 the session token is delivered to the terminal unit 950. However it should be understood that the session token may be delivered to the user device 102 directly. The session token or at least the session token identifier is encoded in a visual code. Step 914 comprises the terminal presenting the visual code embodying the session token or session token identifier. Step 916 comprises opening the app and scanning the visual code. Step 918 comprises retrieving the session token identifier. In this example method the session token identifier is encoded in the visual code to reduce the amount of data that requires encoding. Further only transmitting the session token identifier reduces the risk of the entire session token being hijacked or stolen. This improves security of the authentication protocol described herein.

Step 920 comprises the app (i.e. user device) querying the service provider device for the session token corresponding to the session token identifier. Step 922 comprises returning the session token corresponding to the session token identifier. Step 924 comprises determining the user credential that matches a predefine criteria. The predefined criteria may be the user credential that relates to a user credential issuer or ID authority that is trusted by the service provider. For example, the user database or user device may be configured to store multiple user credentials from multiple user credential issuers. A service provider can define which user credential issuers are trusted by the service provider. The trusted user credential issuer information is included in the session token. The user device is configured to identify the user credential that relates to the specified trusted user credential issuer defined in the session token. If the session token defines multiple trusted user credential issuers, the user device can select the specific user credential the user wishes to use.

Step 926 comprises unlocking the key store i.e. activating the key generator to generate a key pair. Step 928 comprises generating a response data packet and signing the response data packet with the private key. Preferably the response data packet includes a challenge data field that is signed by the private key. The response data packet may be a modified session token. Step 930 comprises sending the response data packet (i.e. modified session token including a signed challenge field and at least the user credential identifier) to the service provider device 104. Step 932 comprises the service provider device 104 checking if the user credential identifier corresponds to a user credential that matches the criteria e.g. relates to a user credential issued by an authorized or trusted user credential issuer. Step 934 comprises querying a list of authorized credential issuers from an ID authority that is trusted by the service provider. Step 936 comprises the service provider device receiving a list of authorized user credential issuers. Step 938 comprises checking if the user credential issuer is authorized to issue a user credential based on the list from the ID authority. The list from the ID authority may be a master list of authorized credential issuers that are accepted by the service provider. Step 938 comprises the service provider checking if the credential issuer corresponding to the credential identifier is an authorized issuer. Step 940 comprises querying the user credential issuer device for a user credential corresponding to the user credential identifier received from the user device 102. Step 942 comprises the service provider device 104 receiving the user credential corresponding to the user credential identifier received from the user. Step 944 comprises verifying if the returned user credential can be signed by the public key located in the identity certificate data object. If credential can be verified because it includes a public key that corresponds to the private key included in the response data packet, the service provider device 104 establishes a service session and authenticates the user at step 946. If the user credential can be verified as a match based on the user credential identifier and the public key, then the user is authenticated and a service session is established. In the illustrated example the user is authenticated at the terminal to use the terminal using the authentication protocol. Alternatively the user may be authenticated to use a website, ecommerce offering or any other service of the service provider on the user device 102 or any other device using the authentication protocol.

The session token as described earlier is preferably a data object or a data string that includes a number of data fields. One example of a session token is shown below:
Session token
Major Fields:
i. ID—the id of the Session token
ii. Challenge—the challenge generate by the Service Provider (the authenticator component)
iii. Response—the response generated by the App by claiming (digital signing the Challenge given)
iv. Identity (identity's identifier)—the identity which used to claim the session.
v. Accept Authority—which Authority(s) does the service provider accept for authentication.
vi. Accept Issuer—which Issuer(s) does the service provider accept for authentication The identifiers used in the authentication protocol must include at least an Issuer field and an ID field. With these two data fields any information can be retrieved. For example the session identifier or session token identifier is used to query the user credential issuer by providing the ID data field and query the user credential database by providing the Issuer data and ID data. In one example the session identifier data format may be:
ii. Format: [Session Issuer identifier, Session ID]

Example implementations of the authentication protocol using a unique user credential that is issued by a trusted user credential issuer will now be described.

EXAMPLE 1

A user named Alex is a citizen of the country EC and want's to open a bank account in the bank named EB Bank. EC is a user credential issuer and also functions as an ID authority. EC is a trusted user credential issuer by EB bank, and EB bank will trust any user credentials issued by EC to a user. The user i.e. Alex can use the method of authentication as described herein to simplify the bank account opening process. The bank EB Bank only accept an identity i.e. a user credential issued by EC's Authority.

User credential i.e. the ID certificate will comprise the following entries:
A. The personal number of Alex in country EC is "EC199088909"
B. The identifier of the Identity Authority is "citizen.gov.ec"
C. The identifier of the Identity Issuer is "Issuer.gov.ec"
D. The Subject ID of Alex given by Identity Authority is "EC199088909@citizen.gov.ec"
E. The ID of the Identity issued by the Identity Issuer is "20170612007"
F. The identifier of the Identity Certificate issued by the Identity Issuer is "[Issuer=issuer.gov.ec, ID=20170612007]"
G. The identifier of the Service Provider is "ebbank.com.ec"
H. The ID of the Service Session created by the Service Provider is "S23423450"
The identifier of the Session token is
"[Issuer=ebbank.com.ec, S23423450]"

At first, identifier ID A is provided to Alex when he was born. The identifier (B) and (C) is given to the government's Authority and the bank respectively. The bank EB uses the authentication method as described herein. Alex is provided the party or subject identifier (D) as a unique identifier in the system. The identifier of the user credential given an Identity ID with the identifier (E). The user credential i.e. the Identity Certificate (F) comprises the subject identifier recorded within it. Alex completes the registration process using an app on the smartphone. The registration process can be the same as described earlier. Following the registration process the user credential i.e. identity Certificate (F) is now stored in a user credential issuer i.e. the Identity Issuer (C) device (or associated database) and Alex's smartphones app. Now, Alex proceeds to the bank's online banking website on his user device e.g. a smartphone and would like to login to manage his account.

The bank's website create a session token with the identifier (I) for the service session. The session token has indicated that it only accept Authority "citizen.gov.ec" i.e. the user credential issuer identifier is "citizen.gov.ec". The website encapsulates the Identifier (I) into an optical code, e.g. a barcode. The barcode is delivered to Alex's smartphone or displayed on a webpage. Alex opens the App on his phone and scans the barcode shown on the website. The App get the Session token by querying "ecbank.com.ec". The App decodes the queried Session token and determines the Identity that matches the criteria defined in the "accept Authority=citizen.gov.ec" data field. The App uses the Identity Certificate (F) to claim the Service as the Identity Certificate is issued by the Authority "citizen.gov.ec".

The App claims the Service Session by signing the Challenge data from the Session token (I) with a private key and generates a response data packet through the related private key of the Identity (i.e. user credential). The App (and hence the user device) is configured to submit the Response data to the service provider. Alex is authenticated into online banking of the bank EB Bank.

EXAMPLE 2

Now Alex is still a citizen of the country EC wants to open another bank account in the bank named ET Bank. ET bank is in another country AU, not the same country EC. Alex has the Identity Certificate (i.e. a unique user credential) issued by EC's Authority already. He also has the Identity Certificate issued by an authority in AU. The bank ET trusts the Identity issued by the EC's Authority. The country EC and the bank ET Bank implement the new method of authentication. The bank ET Bank accepts an Identity (i.e. a user credential) issued by EC's Authority or AU's Authority or both. ET bank only allows new customer to open account in an ATM at their location which may be in a different country.

The user credential i.e. identifier comprises the following entries:
- A. The personal number of Alex in country EC is "EC199088909"
- B. The identifier of the Identity Authority is "citizen.gov.ec"
- C. The identifier of the Identity Issuer is "Issuer.gov.ec"
- D. The Subject ID of Alex given by Identity Authority is "EC199088909@citizen.gov.ec"
- E. The ID of the Identity issued by the Identity Issuer is "20170612007"
- F. The identifier of the Identity Certificate issued by the Identity Issuer is "[Issuer=issuer.gov.ec, ID=20170612007]"
- G. The identifier of the Service Provider is "etbank.com.au"
- H. The ID of the Service Session created by the Service Provider is "OA2358435"
- I. The identifier of the Session token is "[Issuer=etbank.com.au, OA2358435]"

Alex goes to one of the designated ATMs in the country AU. He can select an option to open an account on the ATM. ET Bank creates a Session token with identifier (I) and transmits the Session token to the user device of Alex. The session token specifies the Accept Authority are ["citizen.gov.au", "citizen.gov.ec", "people.gov.ua"] within the Session token. This means that a user credential from either Authority is accepted. The session token also requests for authorization for reading the personal data of the subject who claims the session token. The request is also encoded into the Challenge Field of the Session token. ET Bank encodes the identifier (I) into a barcode and displays the barcode on the ATM machine. ET Bank may also make the identifier (I) available on the NFC reader of the ATM machine. Alex opens the app on this phone and allows the smartphone to scan the NFC reader of the ATM machine. The user device i.e. the app receives the identifier of the session token (I) and fetches the token corresponding to the identifier (I). The app determines there are two Identity Certificates (i.e. user credentials) that are accepted, since user credentials from both EC and AU are accepted. The app requests Alex to select one user credential to proceed with. Alex selects the Identity Certificate (i.e. a user credential) issued by EC's Authority via the app. Alex confirms the authentication and authorization request.

Alex can access the key generator i.e. a key store. In this example access to the key generator is passcode protected. Alex inputs a passcode to unlock the key generator. The app is configured to sign the data in the Challenge Field of the Session token by the private key corresponding to the user credential (i.e. Identity Certificate) selected by Alex (F). The App send the signed data as a response data packet to ET Bank with the identifier (F). ET Bank receives the response data packet and fetches the Identity Certificate (i.e. user credential) by identifier (F). ET Bank queries (B) to ask if Issuer (C) is allowed to issue an Identity Certificate for (B). ET Bank fetches the Identity Certificate (i.e. user credential) from EC's Identity Issuer (C). ET Bank verifies if the signature was created correctly by using the public key in the Identity. A user credential identifier (F) is fetched from the user credential issuer (C). ET Bank verifies the signature. ET Bank uses the Response Data as proof and requests personal data from the Authority by another protocol.

ET Bank may require Alex to confirm the personal data are correct and are up to date. ET Bank creates another Session token for confirmation. ET Bank sends the new Session token identifier to Alex's smartphone. The app receives the identifier and fetches the new Session token from ET Bank. The app can repeat the authentication and confirmation process until Alex is authenticated. Alex has opened a new account in ET Bank.

EXAMPLE 3

In this example Brian wants to apply for a credit card from the bank EB Bank. The bank works closely with XCredit, which is a credit card payment company. The shop EShop is configured to accept XCredit card payment and the authentication method can be used for verifying the ownership of the credit card. XCredit is the Authority and EB Bank is the Issuer.

The user credential i.e. identifier comprises the following entries:
- A. The XCredit card number for Brian is "XC3711808345567889"
- B. The identifier of the Authority (XCredit) is "xcredit.payment"
- C. The identifier of the card Issuer (EB Bank) is "card.ebbank.com.ec"
- D. The Subject ID of Brian's card, given by the Authority is "XC3711808345567889@xcredit.payment"
- E. The ID of the Identity issued by the Identity Issuer is "XC3711808345567889-01"
- F. The identifier of the Identity Certificate issued by the Identity Issuer is "[Issuer=card.ebbank.com.ec, ID=XC3711808345567889-01]"
- G. The identifier of the Service Provider is "eshop.com.ec"
- H. The ID of the Service Session created by the Service Provider is "S934095OP"
- I. The identifier of the Session token is "[Issuer=eshop.com.ec, S934095OP]"

Initially (A) (i.e. X credit card number) is assigned to the credit card that is given to Brian. The new credit card has the Subject ID (A) and the identifier is (D). In this example Brian wishes to register the card into his device e.g. a smartphone. The bank creates a new Identity Certificate (i.e. a user credential) for the card and assigns (E) to it i.e. a user credential identifier. The new Identity Certificate (i.e. user credential) of the card has now an identifier (F). The bank, EBank encodes the identifier (F) (i.e. user credential identifier) of the Identity Certificate (i.e. user credential) into a barcode and sends the barcode to Brian's device e.g. a smartphone or other smart device.

Brian installs the app on his device and uses the app to scan the barcode. The app require Brian to setup a passcode to secure the key store (i.e. key generator) in the app. Brian sets up a password for the key store associated with his device. The key store (i.e. key generator) is controllable by the app. The app finishes the registration process by generating a key pair and submitting the public key to the issuer (EB Bank).

Now the App and EB Bank has a copy of the completed Identity Certificate (i.e. user credential). Brain accesses the online shop of EShop and added several items into the virtual shopping cart. Brian clicks the checkout button and select using XCredit to make the payment. EShop generates a session token (I) and encodes the amount of the goods into the challenge field. The session token has indicated it only accepts authority (B) "xcredit.payment". The session token also encodes the authorization request into the session token and into the challenge field of the session token. EShop encodes the identifier of the session token (I) into a barcode and displays the barcode on the browser. Brian opens the app on his device and scans the barcode. The app fetches the session token by identifier (I). The app searches in the user database and locates a user credential i.e. an Identity Certificate (F) matching the criteria (Accept Authority) specified in the session token. The app show the detail of the session token and require him to confirm the detail. Brian accesses the key store in the app by inputting the passcode.

The app is used to sign the data in the Challenge field of the session token and created a response data packet. The app is configured to cause the user device to send the response data packet with the identifier of the Identity Certificate (i.e. user credential identifier) used to EShop (G). EShop is configured to query the Authority (B) to ask if EBank (C) is allowed to issue Identity Certificate for (B). EShop is configured to query the Identity Certificate (F) from EBank (C). EShop verifies the response data (which is the signature). EShop uses the response data as a proof to finish the payment transaction in another protocol with EBank. The payment process has concluded since Brian has been authenticated.

EXAMPLE 4

Brian still has the credit card issued by EBank and now he is paying his bill in a restaurant FEat. TCredit is another payment card company and has the identifier "tcredit.bank"

The user credential i.e. identifier comprises the following entries:
A. The XCredit card number for Brian is "XC3711808345567889"
B. The identifier of the Authority (XCredit) is "xcredit.payment"
C. The identifier of the card Issuer (EB Bank) is "card.ebbank.com.ec"
D. The Subject ID of Brian's card, given by the Authority is "XC3711808345567889@xcredit.payment"
E. The ID of the Identity issued by the Identity Issuer is "XC3711808345567889-01"
F. The identifier of the Identity Certificate issued by the Identity Issuer is "[Issuer=card.ebbank.com.ec, ID=XC3711808345567889-01]"
G. The identifier of the Service Provider (restaurang) is "feat.food.au"
H. The ID of the Service n created by the Service Provider is "B238729385"
I. The identifier of the Session token is "[Issuer=feat.food.au, B238729385]"

In this example Brian has finished his meal and heading to pay the bill. The waiter clicks pay bill function on the ordering terminal. The system of the restaurant will then create a Session token with the identifier (I) and encode the detail of the bill into the challenge field e.g. the value of the bill. In the session token, it is indicated that the restaurant i.e. the service provider will only allow and accept payment from a card issued by either XCredit or TCredit. Hence the session token includes in the Accept Authority data field ["xcredit.payment", "tcredit.bank"] to denote these are the two accepted authorities from which a user credential will be accepted. The system encodes the identifier (I) into a barcode that can be scanned and decoded by a user device. The ordering terminal prints out the bill and includes the barcode on the bill. The bill is delivered to Brian. Brian read the bill and decides to pay. Instead of showing or using his credit card, Brian can use the authentication method to pay. Brian uses his device e.g. a smartphone and opens an app on the phone that facilitates the authentication method. Brian scans the barcode on the bill. He then double check the total amount is correctly shown on the app and confirms the payment. The app has the Identity Certificate (F) issued with Authority (B) and it matches the requirement in the field Accept Authority. The app is used to sign the value in the Challenge Field and generate an Response Data.

The app submits the response data with the identifier of the Identity Certificate (F) used to FEat (G). The identifier is a user credential identifier. The system of the restaurant (i.e. the service provider device) verifies the signature and confirms Brian has verified his ownership of the credit card. The system of the restaurant (i.e. the service provider device) handles the payment transaction with another protocol by using the Response Data as a proof. The waiter can go back to the order terminal and confirm that Brian has paid the bill.

The authentication protocol or method and authentication system as described herein are advantageous because the authentication protocol does not require a user to establish a login and password with every service provider the user interacts with. The authentication method as herein described, allows for a single unique user credential to authenticate a user. The new authentication method is similar to using a physical passport, because the user credential is unique to each user and is authorized by an accepted user credential issuer. The authentication method as described herein provides an easier and faster authentication method without the need for a user to remember multiple user names and passwords. Further it may also reduce the capital costs for service providers since service providers do not need to keep storing user name and password of each new user. The authentication method as described herein also makes it easier for a user since a user can use a unique user identifier to verify the user rather than having to remember a number of user names and passwords. The authentication method also may provide for a secure authentication method since the method uses an optical code to transmit a session token identifier and uses a locally generated key pair from a key generator to encode response data packets using asymmetric cryptography. The locally generated key pair improves the security of the authentication method.

In some cases, a user may have been authenticated on a service session and the service provider would like to ask the user for authorizing an action (such as for example confirming the payment transaction, confirming the info for subscribing a new service is correct). As each user credential (i.e. identity certificate) can only have one key pair, and the private part of the key is located in locally within the user database or user device e.g. within a key store. The service provider can simply generate another session token and deliver the new session token to the user device directly, instead of encoding the identifier of the session token into a barcode and require the user to scan the barcode again by using the app on the user device. This also enhances the security by only allowing the Identity Certificate which used for authentication before to performing authorization.

The identifier of a data object is similar to a primary key in a database. The identifier of a data object e.g. a session token or ID certificate must contain two fields; 1) the identifier of the issuer and 2) the ID of the data object. These two fields are essential for each type of identifier described herein. The design of the system 100 is such that all parties are linked to each other via a communications network 108 e.g. the internet. Hardware devices associated with each party are linked to each other. A public or private communications network can be used. By providing the identifier of a data object, the data object can be more easily retrieved than having to transmit the entire data object. The data object can be queried using any suitable querying protocols. For example the data object can be queried by one of two ways.

For example the identifier of the issuer is basically mapping to an IP address which could be obtained through DNS. This allows a client (e.g. a user device or service provider device) to query the data object issuer by connecting to the IP address which obtained by the DNS; by providing the data object ID to the data object issuer. The issuer can return the data object to the client. The connection between the client and the issuer is preferably a secure connection (e.g. by TLS/SSL, DNSSEC, VPN . . . etc). Alternatively it may be assumed the data object issuer has created a distributed database (could be a blockchain database) across the Internet. Instead of querying the issuer directly, a client can query the distributed database and obtain the result. In this mode, each data object has to be signed by the issuer and the signature has to be stored together with the data object. The client shall verify the signature to ensure the data object was issued by the issuer. In this example the data object can be any suitable data object e.g. the user credential (i.e. ID certificate) or the session token. The system is set up to utilize one of these methods to retrieve a data object using one of the two described methods. This reduces latency times, speeds up processing and reduces bandwidth requirements for the authentication method.

It will be appreciated by persons skilled in the art that numerous variations and/or modifications may be made to the present invention as shown in the specific embodiments without departing from the spirit or scope of the invention as broadly described. The present embodiments are, therefore, to be considered in all respects as illustrative and not restrictive.

It will also be appreciated that where the methods and systems of the present invention are either wholly implemented by computing system or partly implemented by computing systems then any appropriate computing system architecture may be utilized. This will include stand-alone computers, network computers and dedicated hardware devices. Where the terms "computing system" and "computing device" are used, these terms are intended to cover any appropriate arrangement of computer hardware capable of implementing the function described.

Although not required, the embodiments described with reference to the Figures can be implemented as an Application Programming Interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

Any reference to prior art contained herein is not to be taken as an admission that the information is common general knowledge, unless otherwise indicated. It is to be understood that, if any prior art information is referred to herein, such reference does not constitute an admission that the information forms a part of the common general knowledge in the art, any other country.

As used herein, the term "and/or" includes any and all possible combinations or one or more of the associated listed items, as well as the lack of combinations when interpreted in the alternative ("or").

The invention claimed is:

1. A system for authenticating a user to establish a service session, the system comprising:

a user device, the user device being a client device, a service provider device configured for accessing by the user via the user device, the service provider device being a cloud server in electronic communication with the user device, the service provider device and user device configured for two way communication with each other via a communication network, the service provider device associated with a service provider and the user device associated with a user, a user credential issuer device, the user credential issuer device being a server associated with a user credential issuer, configured for two way communication with the service provider device and the user device, the user credential issuer configured to manage identities of users, extract user credential information, and write user credential information to a user credential database, the service provider device configured to receive an access request from the user device, and authenticate a user based on a unique user credential associated with the user, wherein the unique user credential is issued by the user credential issuer that is authorized by the service provider to issue user credentials, the service provider device configured to establish a service session between the user device and the service provider device to allow the user to use a service provided by the service provider, wherein the service provider device is further configured to generate a session token that corresponds to the service session, and encode the session token with an authorization criteria; and wherein the service provider device is configured to:

receive a response data packet comprising at least a user credential identifier from the user device,
  determine a user credential that corresponds to the user credential identifier;

wherein the user device is configured to generate the response data packet comprising the user credential identifier, and the user device is configured to sign the response data packet with at least a private key using an asymmetric cryptographic process, wherein the service provider device is configured to verify the response data by a public key located in the user credential received from the user credential issuer device, and the service provider device is configured to determine a user credential is a match if the public key corresponds to the private key used to sign the response data packet.

2. The system in accordance with claim 1, wherein the unique user credential is a unique ID certificate associated with the user, wherein the ID certificate is a data object defining at least a user identity and a user credential issuer identity.

3. The system in accordance with claim 1, wherein
the user credential issuer device is configured to issue the unique user credential to a user, and wherein the user credential issuer is authorized by the service provider as an accepted user credential issuer.

4. The system in accordance with claim 1, wherein the service provider device is configured to query the credential issuer device with the received user credential identifier,
the user credential issuer device configured to transmit a user credential corresponding to the user credential identifier,
the service provider device configured to receive the user credential corresponding to the user credential identifier, and
the service provider device configured to check the received user credential corresponds to the received user credential identifier.

5. The system in accordance with claim 4, wherein the service provider device establishes a service session if the received user credential from the credential issuer device corresponds to the user credential identifier received by the service provider device, as part of the response data packet transmitted by the user device.

6. The system in accordance with claim 1, wherein the session token is a data object that comprises one or more of an ID of a session data field and an authorization criteria data field.

7. The system in accordance with claim 1 wherein the authorization criteria comprises at least an accepted user credential issuer data field that defines the user credential issuer that will be accepted by the service provider in order to authenticate the user.

8. The system in accordance with claim 1, wherein the service provider device is configured to provide a visual code to the user device, wherein the visual code comprises the session token.

9. The system in accordance with claim 8, wherein the visual code is a machine readable optical code that is configured to be read or scanned by the user device to extract information from the visual code.

10. The system in accordance with claim 8, wherein the visual code is one of a one dimensional barcode or a two dimensional code.

11. The system in accordance with claim 8, wherein the user device receives the visual code from the service provider device in response to a use request, the user device is configured to decode the visual code to extract the session token from the visual code, and the user device is configured to process the session token to extract a user credential identifier.

12. The system in accordance with claim 8, wherein the user device is further configured to identify a user credential issuer from the user credential issuer data field in of the session token, the user device is configured to identify a user credential issuer from the user credential issuer data field of the session token, the user device configured to identify a user credential that corresponds to the user credential issuer, and; the user device configured to identify the user credential identifier based on the identified user credential.

13. The system in accordance with claim 1, wherein the system comprises a key generator, the user device configured to obtain a key pair from the key generator, wherein the key pair comprises the public key and the private key, and wherein the user device comprises the key generator and the key generator being controlled by the user device.

14. The system in accordance with claim 13, wherein the user device is configured to query a user database of user credentials to identify a user credential that corresponds to a received user credential issuer defined in a user credential issuer data field within the received session token, the user database comprising a list of one or more user credentials issued by each user credential issuer, the database relating each user credential with the user credential issuer that issued the user credential,
the database being populated by an electronic registration process, and;
wherein the user device is configured to identify the user credential that corresponds to the user credential issuer listed in the session token.

15. The system in accordance with claim 1, wherein the electronic registration process is implemented by the system for authenticating a user wherein
the user credential issuer is configured to receive a request for a unique user credential from the user device,
the user credential issuer configured to create a unique user credential associated with the user based on a verified identity of the user, the identity of the user being verified by the user credential issuer,
the user credential issuer device configured to transmit the user credential to the user device, and
the user device configured to receive and store the user credential from the user credential issuer device in the user database.

16. The system in accordance with claim 15, wherein the user device is further configured to generate a key pair of a private key and a public key, the user device configured to associated the received user credential with the generated key pair, and the user device is configured to provide the public key of the key pair associated with the user credential to the user credential issuer device for storing by the user credential issuer device.

17. A computer implemented method of authentication of a user, the method comprising steps of:
providing a use request to a service provider device from a user device,
receiving the use request by the service provider device,
generating a session token by the service provider device, wherein the session token is a data object that comprises one or more of an ID of the session data field and an authorization criteria data field,
wherein the authorization criteria comprises at least an accepted user credential issuer data field that defines the user credential issuer that will be accepted by the service provider in order to authenticate the user,
providing a visual code to the user device by the service provider device, wherein the visual code comprises the session token generated by the service provider device,
the visual code is a machine readable optical code that is configured to be read or scanned by the user device to extract information from the visual code, wherein the visual code is a machine readable code is a barcode,
decoding the visual code to extract the session token from the visual code,
processing the session token to extract a user credential issuer from the user credential issuer data field of the session token,
querying a user database of user credentials to identify a unique user credential that corresponds to a received user credential issuer, the user database storing a list of one or more unique user credentials that correspond to each user credential issuer, wherein each of the unique user credentials is issued by a said user credential issuer which is authorized by the service provider to issue user credentials, the user database being populated by a computer implemented registration process, identifying the user credential that corresponds to the user credential issuer listed in the session token, generating a response data packet comprising the user credential identifier, signing the response data packet with a private key using an asymmetric cryptographic process, a challenge data field of the response data packet being signed by the private key, and verifying the response data packet by a public key located in the user credential received from the user credential issuer, and the received user credential is considered to match if the public key corresponds to the private key used to sign the response data packet.

* * * * *